Dec. 18, 1962 E. W. SCHELLENTRAGER 3,069,030
SCRAP CHARGING CAR
Filed April 6, 1961 3 Sheets-Sheet 2
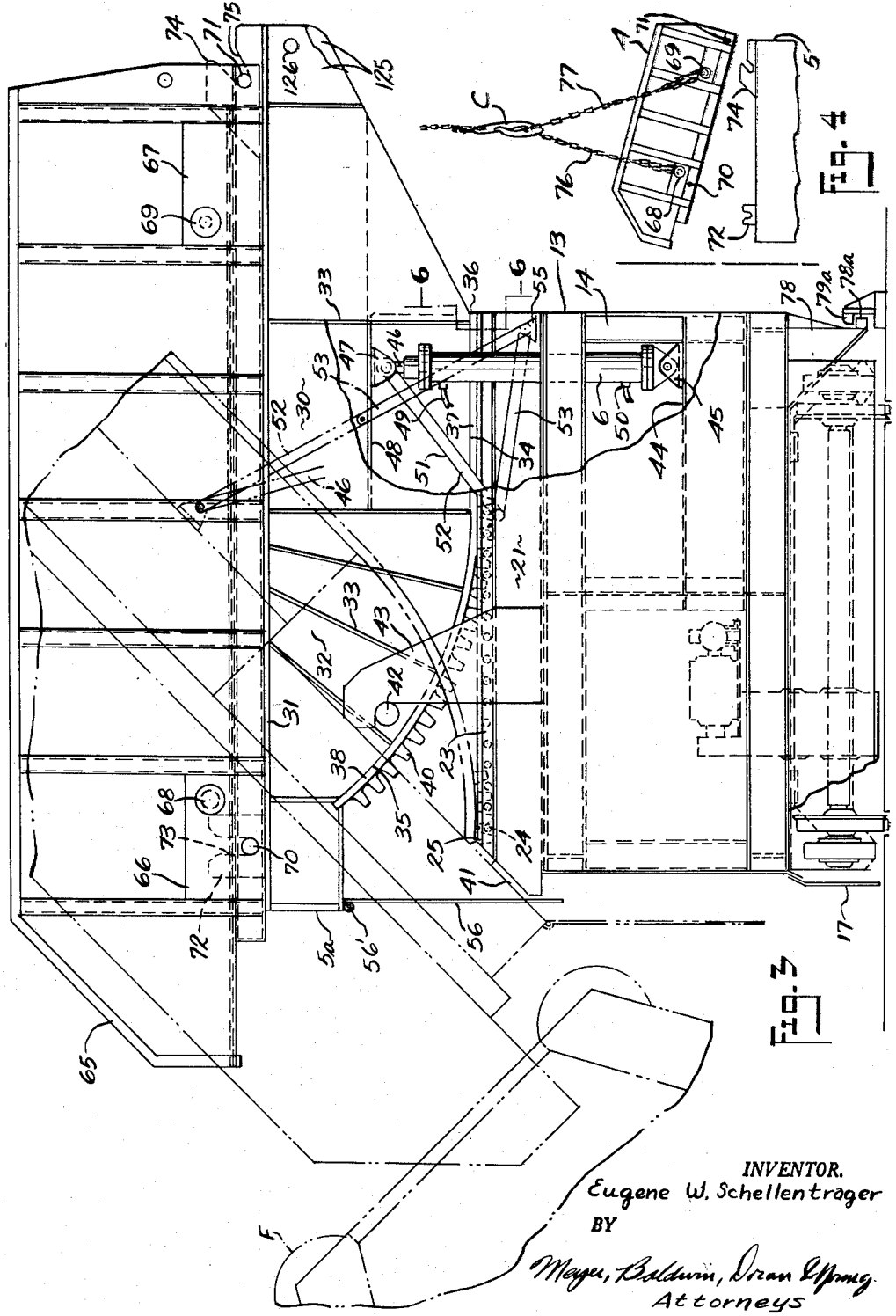
INVENTOR.
Eugene W. Schellentrager
BY
Meyer, Baldwin, Dean & Epping
Attorneys Dec. 18, 1962  E. W. SCHELLENTRAGER  3,069,030
SCRAP CHARGING CAR
Filed April 6, 1961  3 Sheets-Sheet 3
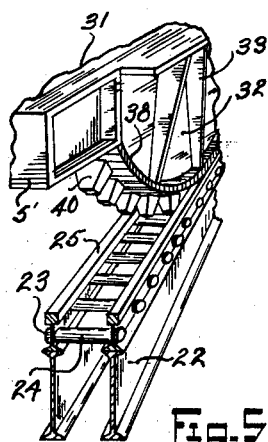
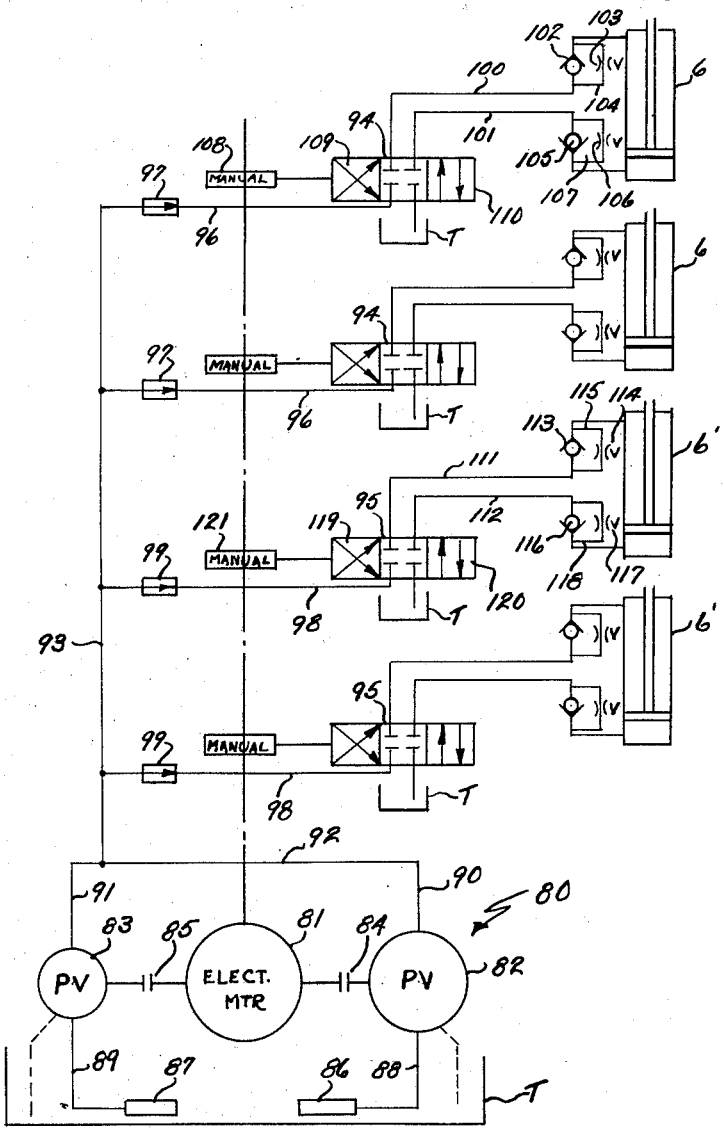
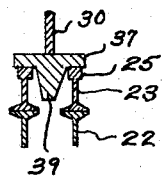
INVENTOR.
Eugene W. Schellentrager
BY
Meyer, Baldwin, Dean & Young
Attorneys United States Patent Office 3,069,030
Patented Dec. 18, 1962

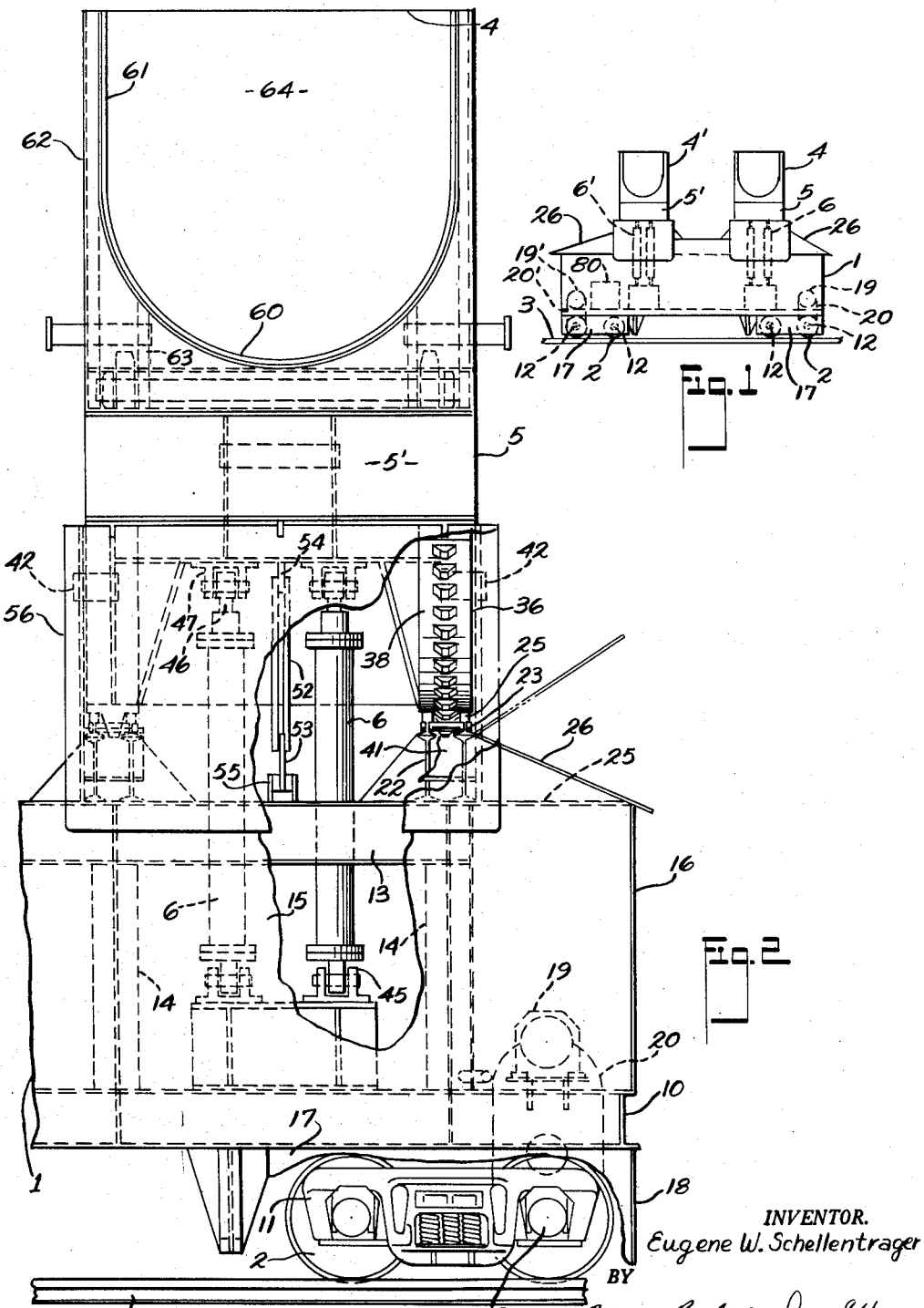

3,069,030
SCRAP CHARGING CAR
Eugene W. Schellentrager, Shaker Heights, Ohio, assignor to The Atlas Bolt & Screw Company, Cleveland, Ohio, a corporation of Ohio
Filed Apr. 6, 1961, Ser. No. 101,090
3 Claims. (Cl. 214—18)

This invention relates to means for charging metal processing furnaces and more particularly to a scrap charging car for conveying scrap metal to a furnace or furnaces and unloading the same in a minimum length of time. This invention is especially useful in the charging of oxygen furnaces wherein the loss of heat which results from delays in charging is a factor of extreme importance.

It is a general object of this invention to provide a rail type, wheeled carrier having mounted thereon one or more tiltable charging boxes, said carrier including drive means for moving the carrier to and from a furnace to be charged and power means for rapidly tilting the charging boxes in a controlled manner.

A more specific object of the invention is to provide a scrap charging car of the above type wherein handling and discharge of the scrap is facilitated by rolling the load over whereby the load tilts and concurrently moves in the direction of the furnace in a single, controlled motion.

Another more specific object is to provide such a car which allows for increased clearance between the furnace and the charging boxes over that found in conventional apparatus for the same purpose.

A further object of the invention is to provide a scrap charging car having the above characteristics wherein the operating elements of the device are completely protected from the heat of the furnace and from debris which may be blown from the furnace during charging.

Other objects of the invention and the invention itself will be understood from the following specification and the accompanying drawings, in which said drawings:

FIG. 1 is a side elevation showing, in general, the scrap charging car of this invention;

FIG. 2 is an enlarged side elevation of substantially one-half of the car of FIG. 1 with certain portions cut away;

FIG. 3 is an end elevation of the car shown in a smaller scale than FIG. 2;

FIG. 4 is a reduced, side elevation of a charging box and a portion of a supporting cradle showing the method of assembling the recited parts;

FIG. 5 is a perspective of a portion of a rocker member and a supporting track thereof;

FIG. 6 is a sectional view taken along the line 6—6 of FIG. 3; and

FIG. 7 is a diagram of the hydraulic system for actuating the charging mechanism of the scrap car.

Referring now to the drawings in all of which like parts are designated by like reference numerals, FIG. 1 shows, in general, the scrap charging car of this invention which comprises a body portion 1 mounted upon rail type wheels 2 whereby it is adapted for rolling engagement with a pair of conventional, parallel rails 3. A pair of charging boxes 4 and 4' are mounted on top of the body portion 1, said charging boxes being disposed transversely to the longitudinal dimension and direction of movement of the car.

The charging boxes 4—4' are upwardly open and are adapted to receive loads of scrap metal and the like whereby said scrap metal is delivered to the vessel of a metal processing furnace for discharge into said vessel. Each charging box has one open end and means is provided whereby the box is tilted in the direction of such open end thereby causing the scrap metal contained therein to slide laterally and downwardly into the open mouth of the vessel. The car travels along appropriately placed rails 3 whereby it is brought to a position alongside the vessel with one of the charging boxes 4—4' disposed adjacent said vessel. Independently operative power means is provided for then tilting each charging box whereby the contents thereof discharge into the furnace vessel.

The charging boxes 4—4' and the associated mechanism for tilting the boxes are identical in all respects, and only one such assembly will be described in detail. As shown in FIG. 1, the charging boxes are spaced generally symmetrically along the length of the body portion 1, and each box is substantially a duplicate of the other one.

The body portion 1 is mounted upon a chassis 10 which is in turn adapted for travel upon the rails 3 by means of two four-wheel trucks 11 which carry the rail type wheels 2. Each truck 11 mounts two pairs of wheels 2 in a conventional manner, the wheels of each pair being rotatably mounted by means of a transverse axle 12. It will be understood that a truck and wheel assembly similar to that shown in FIG. 2 is also provided at the opposite end of the chassis 10.

Referring now to FIGS. 2 and 3, the body portion 1 comprises a rectangular frame 13 which is spaced a substantial distance above the chassis 10 by means of a plurality of supporting members 14 and which extends longitudinally beneath both the charging box 4 and the charging box 4'. One side of the body portion is covered by a heavy metal plate 15 which extends the full length of the chassis 10 and projects upwardly from said chassis to the frame 13. The plate 15 is disposed upon that side of the car which is adjacent the furnace during the charging operation, hereinafter referred to as the discharge side of the car. Similar heavy plate is provided at the ends of the body portion 1 as indicated at 16, and the opposite side of the car or that side which is disposed away from the furnace is left open for easy access to the operative elements disposed within the body portion and which will hereinlater be fully described. Shields 17 project downwardly from the chassis 10 outside the trucks 11 on the discharge side of the car, said shields extending downwardly a sufficient distance whereby the entire trucks and substantially all of each wheel is covered. A similarly depending shield 18 projects downwardly from each end of the chassis 10, each said shield 18 extending laterally a sufficient distance to cover the wheel and truck assemblies on both sides of the car at the ends of said car. The top of the body portion 1 is also covered by a plate 25 which is suitably apertured beneath the charging boxes 4—4' to afford space for mounting tilting mechanism to be hereinlater fully described.

The axles 12 which are disposed adjacent the ends of the car are drivingly connected to traction motors 19 and 19' through transmissions 20 and 20' respectively. The traction motors 19—19' are mounted upon the chassis 10 within the body portion 1, and the transmissions 20—20' extend downwardly therefrom and are connected to the associated axles 12. The traction motors 19—19' are individually operable and either alone is sufficiently powerful to propel the scrap charging car.

The charging boxes 4—4' are mounted upon normally level cradles 5 and 5' respectively, each said cradle being mounted upon the body portion 1 in such manner as to rock transversely of said body portion in the direction of the discharge side of the car. Said cradles are rocked by means of pairs of hydraulic cylinder and piston motors 6 and 6' as indicated in FIG. 1. FIG. 2 illustrates the details of the cradle 5, its associated charging box 4, and cylinder and piston motors 6, and it will be understood that the details of the assembly as hereinafter described apply equally to the similar assembly adjacent the opposite end of the car which comprises, basically, the charging box 4', the cradle 5', and the actuating motors 6'.

Referring now particularly to FIGS. 2 and 3, the cradle 5 is supported by a pair of spaced, parallel track assemblies 21 which are mounted across the top of the rectangular frame 13 in such manner as to be positioned transversely relative to the body portion 1. Each track assembly 21 comprises a pair of closely spaced, parallel I-beams 22 which are welded or otherwise suitably secured to the top surface of the frame 13 and each of which supports a small rail 23 upon its upwardly directed surface. The rails 23 are also welded or otherwise suitably secured upon the I-beams 22 and are connected to each other by a plurality of uniformly spaced cross members 24 which are positioned transversely relative to the longitudinal dimension of said rails, said cross members projecting at their ends through suitable apertures in said rails just below the rail heads 25. The cross members 24 extend from that end of each track assembly 21 which is disposed adjacent the discharge side of the car a distance substantially more than half of the length of the rails 23 in the direction of the open side of said car.

Hinged shield plates 26 are hingedly connected adjacent the top of the endmost I-beams 22 and extend slightly beyond the ends of the body portion 1 thereby providing downwardly slanting deflectors adjacent the endmost track assemblies 21.

The cradle 5 comprises a frame portion 30 made up generally of heavy plate steel having a top supporting plate 31 for receiving the charging box 4 and parallel, spaced side plates 32 reinforced by suitable brace members as indicated at 33. The side plates 32 are so spaced as to be aligned with the track assemblies 21 and are provided with lower edges each having a straight portion 34 disposed adjacent the open side of the car and an arcuately curved portion 35 disposed generally adjacent the discharge side of said car. The straight portion 34 and curved portion 35 of each side plate 32 afford a continuous, uninterrupted lower edge to which is secured a rocker 36 of heavy steel having a straight portion 37 and a curved portion 38 which exactly conforms to the contour of the lower edge of the associated side plate 32. The supporting plate 31 projects forwardly in the direction of the discharge side of the car substantially beyond the ends of the rockers 36 and is provided therebelow with a boxlike stop member 5a.

Each rocker 36 is of such width as to overlap and rest upon the spaced parallel rails 23 and is provided with a downwardly projecting rib 39 which extends uninterruptedly throughout a substantial portion of the straight portion 37 and is notched at uniformly spaced intervals adjacent the discharge side of the car in the area of the curved portion 38 thereby providing a plurality of teeth 40 radiating outwardly from said curved portion. The rib 39 (FIG. 6) is downwardly tapered and projects downwardly between the rails 23, and the teeth 40 are downwardly tapered on four sides and are generally frusto-pyramidic in shape. Said teeth extend from the end of the curved portion 38 adjacent the discharge side of the car in the opposite direction to a point slightly within the straight portion 37. The teeth 40 are so interspaced and are of such size that they are adapted to intermesh with the spaces between the cross members 24 when the cradle 5 is rocked or tilted in the direction of the discharge side of the car.

As shown in FIG. 3, the cradle 5 is in the level or horizontal position whereby the plate 31 is horizontally disposed and only a few of the teeth 40 are engaged between the cross members 24 adjacent the straight portion 37 of the rocker 36. When the cradle is rocked to the dotted line position of FIG. 3, a few of the teeth adjacent the end of each curved portion 38 which is disposed adjacent the discharge side of the car engage corresponding spaces between cross members 24 in the similarly disposed end of the associated track assembly 21; and during the tilting of the cradle, the teeth 40 successively engage and disengage with the track assembly as the rocker 36 moves along said track assembly.

It will be noted that each pair of I-beams 22 are downwardly tapered adjacent the discharge side of the car, and a heavy stop plate 41 is welded or otherwise rigidly secured across the tapers. The cradle 5 tilts to substantially a 45 degree angle whereby the stop member 5a of said cradle comes into flatwise contact with said stop plate to limit the tilting of said cradle and its associated charging box 4.

Stop means is also provided to limit the movement of the cradle 5 when it is rocked from the tilted position as shown in dotted line to the level or horizontal position as shown in full line. Such stop means comprises lugs 42 which project outwardly from the side plates 32 respectively and engage a pair of generally hooked shaped stop members 43 which are secured to the outer side of the track assemblies 21 and project upwardly therefrom just outside the rockers 36. As well shown in FIG. 3, when the cradle 5 is in the upright or level position, the lugs 42 abut the stop members. The stop members 43 provide for lateral stability of the cradle should the car be started or stopped suddenly thereby preventing any upsetting of the scrap boxes along the direction of the center line of the car.

The cylinder and piston motors 6 are mounted side by side upon a heavy support 44 which is secured in turn upon the chassis 10. The lower end of each motor 6 is pivotally mounted upon the support 44 by means of generally U-shape brackets as indicated at 45. Each motor 6 has an upwardly projecting piston rod 46 which is similarly pivotally mounted by means of a bracket 47 to the lower surface of a horizontal plate 48 secured between the side plates 32. Each cylinder 6 is provided with fluid connectors 49 and 50 by means of which fluid is introduced or exhausted at the top or bottom of said cylinder respectively to cause extension or retraction of each piston rod 46 in a conventional manner.

In addition to the stop plate 41 there is provided a foldable safety link element 51 for the purpose of limiting the tilting motion of the cradle 5 when it is tilted or rocked in a direction of the discharge side of the car. The safety link element 51 comprises a pair of parallel links 52 pivoted at their upper ends upon a downwardly projecting bearing member 54 which is secured to the bottom surface of the horizontal plate 48 and is interposed between the upper ends of said pair of links. The generally downwardly directed ends of the links 52 are pivotally connected to another, similar link 53 having one end thereof interposed between the links 52 with the other end thereof pivoted to a bearing member 55 which is mounted upon the frame 13 adjacent the open side of the car. The safety link element 51 is disposed intermediate the cylinder and piston motors 6, and when the cradle 5 is in the horizontal position, said element partially folds upon itself as shown in full line in FIG. 3. Tilting of the cradle 5 to the position as shown in dotted line causes the links 52—53 to straighten out or unfold, and their combined length is such that the limit of their extensibility is reached when the cradle is tilted to its maximum position. The pivotal mounting of the lower end of the motors 6 at the U-shaped brackets 45 and the similar pivotal mountings of the piston rod 46 to the brackets 47 enable said motors to tilt and thus follow the cradle 5 in its rocking motion. The extreme tilted position of the cradle 5 places the links 52—53 and the piston rod 46 in the positions as indicated in broken line in FIG. 3.

As further shown in dotted line in FIG. 3, the maximum tilted position of the cradle 5 brings the charging box 4 into such position that the discharge end of the box enters the open mouth of a furnace vessel F which has been opositely tilted in a conventional manner whereby it is adapted to receive the scrap material being discharged from the charging box. To protect the rocking mechanism of the cradle which comprises the rockers 36 and the track assemblies 21, a heavy metal shield 56 is pivotally hung from the outermost lower edge of the stop element 5a of the cradle 5. When the cradle is in the upright position, the shield 56 normally hangs downwardly below the level of the track assembly 21 thereby affording complete protection of the rocker mechanism for the purpose of deflecting any material which may be blown out of the vessel while it is being charged. The shield 56 always maintains its vertical position due to the fact that it is hingedly connected at its upper edge as indicated at 56', and during the rocking motion it simply moves outwardly and downwardly to a position whereby it is interposed generally between the mouth of the furnace vessel F and the discharge side of the body portion 1 as shown in broken line.

From the foregoing it will be clearly seen that the cradle 5 is maintained against lateral displacement relative to the track assemblies 21 due to the fact that either the rib 39 and/or some of the teeth 40 are interposed between the pairs of rails 23. Slippage of the rockers 36 lengthwise along the track assemblies 21 is also prevented due to the fact that in every degree of tilted position of the cradle, some of said teeth are in engagement with the spaces between some of the cross members 24.

As well shown in FIG. 2, the charging box 4 has an inner contour which is U-shaped as seen from the discharge end thereof having a curved bottom portion 60 and straight side wall portions 61. Said charging box also has ribbed outer walls 62 covering its sides and extending below the level of the bottom 60 and inwardly spaced supporting walls 63 which are positioned below portions of the bottom wall and assist in the support thereof. The outer and inner walls 62 and 63 extend throughout the length of the charging box which is closed at the end thereof opposite the discharge end by means of an end wall 64. The walls 62 are tapered at the upper edges adjacent the discharge end of the box as indicated at 65 to afford easier entry into the mouth of the furnace vessel.

Reinforcing plates 66 and 67 are provided adjacent the discharge and closed ends of the box respectively to which are attached lifting lugs 68 and 69 which project inwardly through suitable apertures in said plates, the outer ribbed walls 62, and the inner supporting walls 63. It will be understood that the reinforcing plates 66 and the associated lifting lugs 68 are provided on both sides of the charging box adjacent the discharge end thereof and that, similarly, reinforcing plates 67 and lifting lugs 69 are provided on both sides of the box adjacent the opposite end thereof.

A positioning bar 70 is also provided adjacent the discharge end of the charging box 4, said positioning bar being mounted through and between the walls 62 and 63 adjacent the lower edges of said walls. The opposite end of the charging box is similarly provided with a positioning bar 71 mounted on the same manner adjacent the lower edges of said walls. The top plate or supporting plate 31 of the cradle 5 provides upwardly directed retainers 72 adjacent the discharge end of said cradle, said retainers normally projecting upwardly between the outer and inner walls 62 and 63 and affording upwardly open, U-shape slots 73 adapted to nestingly receive the positioning bar 70. Correspondingly positioned, generally hook shape retainers 74 are provided adjacent the closed end of the charging box 4 which are adapted to receive the positioning bar 71. The retainers 74 are obliquely outwardly slotted as indicated at 75 whereby when the cradle and charging box are rocked, said charging box is retained adjacent its raised end against any possible vertical displacement relative to the cradle during the rocking or charging motion.

The charging box 4 is maintained upon the cradle 5 solely by the pull of gravity and the interaction between the positioning bars 70—71 and the retainers 72—74. FIG. 4 illustrates the manner in which the charging box 4 is assembled to the cradle 5. The charging box 4 is suspended above the cradle 5 by means of a conventional crane the hook of which is shown at C. Suitable chains or cables are fastened between the lift lugs 68 and 69 and the crane, the chain connecting the lift lug 68 as indicated at 76 being substantially shorter than the chain connecting the lift lug 69 as indicated at 77. The charging box 4 is thus suspended in a tilted position with the discharge end being substantially raised above the closed end thereof.

The scrap charging box in the position as illustrated in FIG. 4 may be lowered whereby the positioning bar 71 is first caused to enter the oblique slot 75 after which further lowering of the box will cause the positioning bar 70 to drop into the vertical slot 73 of the retainer 72. Removal of the charging box 4 from the cradle is effected by using the above procedure in reverse with the discharge end of the box being first raised to lift the positioning bar 70 out of the slots 73 after which the positioning bar 71 is readily removable from the oblique slots 75.

Stabilizing means is provided on the scrap charging car for the purpose of preventing an overturning of the car during the rocking of the cradles. This means comprises a pair of stabilizers 78 which are mounted to and project downwardly from the chassis 10 adjacent the open side of the car, said stabilizers having outwardly projecting retainer members 78a adapted to project under oppositely directed retainer members 79a of hold-down members 79. Said hold-down members are rigidly secured to the common supporting surface of the car itself adjacent the furnace whereby when said car is brought into position for charging, said retainers 78a are positioned under the hold-down retainers 79a. If a sudden shift in the center of gravity in the scrap load effects a tilting motion in the car, said car is prevented from leaving the track by the stabilizers' engagement with the hold-down members.

The pressure fluid supply source for operating the hydraulic cylinder and piston motors 6—6' comprises a pump stand 80 which is preferably mounted at any suitable place within the body portion 1 of the scrap charging car. FIG. 7 shows in simple diagrammatic form the elements of the pump stand and the means by which the cradles and charging boxes are actuated in a controlled manner.

The pump stand 80 contains an electric motor 81 drivingly connected to a pair of hydraulic pumps 82 and 83 through flexible couplings 84 and 85 respectively. The pump 82 is relatively the larger of the two pumps and is adapted to pump a large volume of fluid at a standard pressure which is ordinarily sufficient to tilt the loaded charging boxes. Such a pump would be, for example, rated 70 g.p.m. pumping against 1000 p.s.i. Pump 83 is relatively smaller and would have a capacity, for example, of 10 g.p.m. ordinarily also delivering 1000 p.s.i. but capable of pressures up to 1400 p.s.i. The smaller pump 83 is controlled in a conventional manner by a suitable governor which automatically causes it to deliver the higher pressure when for any reason excessive resistance is met by the motors 6—6'. Such might be the case where the scrap load on a charging box was greatly off center.

The pumps 82 and 83 pump the hydraulic fluid from a tank T through suitable filters 86 and 87 and hydraulic lines or conduits 88 and 89 respectively. Fluid from the pump 82 is pumped out through a line 90 and fluid from the pump 83 is pumped out through a line 91, said lines being interconnected by line 92. Fluid from both pumps then passes into line 93 which is connected to line 92 and to which all of the cylinders 6—6' are connected in parallel.

The cylinder and piston motors 6—6 are each separately controlled or actuated by a valve 94, and the cylinder and piston motors 6'—6' are similarly each actuated by means of a valve 95. All of the valves 94 and 95 are here shown in their non-actuating or neutral position. The valves 94 are connected to the line 93 through lines 96 each of which has a manual cutoff valve 97 interposed therein. Similarly, the actuating valves 95 are connected to the line 93 through lines 98 each having interposed therein a manual cutoff valve 99.

Each of the valves 94 directs fluid to the top and bottom of each motor 6 above and below the motor's piston by means of lines 100 and 101 respectively. The line 100 has interposed therein a ball check 102 having a variable flow restriction valve 103 connected into a parallel line 104 which is connected around said ball check. In a similar manner, line 101 has therein a ball check 105 which is by-passed by a line 107 having interposed therein a variable flow restriction valve 106. Each ball check 102—105 is so positioned in its respective line as to automatically seat and block the flow of fluid through said line in the direction of the associated motor 6. Therefore, when fluid is directed to a motor 6 either above or below the piston thereof, said fluid is forced to pass through one of the restriction valves 103—106 to enter the cylinder at a predetermined rate depending upon the setting of the said restriction valves. However, fluid exhausting from the cylinder either above or below the piston thereof automatically unseats one of the ball checks 102—105 whereby there is unrestricted flow of the exhausting fluid back through a valve 94 to the tank T.

Each valve 94 has a manual control 108 by which the associated valve is shiftable to either of two flow positions represented by the flow patterns as indicated at 109 and 110. As indicated by the arrows, when the valve 94 is shifted to the position represented by the flow pattern 109, fluid from the line 96 crosses over to the line 101 and enters the motor 6 at the lower end thereof thereby causing the associated piston rod 46 to be extended upwardly in a lifting effort which tilts the associated cradle and charging box. When said valve is shifted to the position represented by the flow pattern 110, fluid from line 96 passes through the line 100 into the motor 6 adjacent the top thereof above the motor's cylinder thereby causing a retraction of the piston rod resulting in a lowering or leveling of the associated cradle and charging box.

The cylinder and piston motors 6'—6' are each operated through a valve 95 in the same manner as the motors 6—6. Line 111 connects each valve 95 with the upper end of an associated motor 6', and a line 112 similarly connects said valve with the lower end of said motor. Line 111 has a ball check 113 interposed therein and a restriction valve 114 disposed in a by-pass line 115. Line 112 has ball check 116 therein by-passed by line 118 having a variable flow restriction valve 117 interposed therein. The positions of each valve 95, other than the neutral or non-actuating position, are indicated at 119 and 120, the flow pattern 119 indicating the position for directing fluid to tilt the associated cradle, and flow pattern 120 representing the position used for leveling or lowering said associated cradle. Each valve 95 is also actuatable by a manual control as indicated at 121.

From the foregoing description, it will be understood that each of the cylinder and piston motors 6—6 or 6'—6' is separably and independently actuatable by means of the separate controlling valves 94 and 95 and that each said motor may be separably isolated from the fluid system by means of the cutoff valves 97 and 99. The pairs of motors 6—6 and 6'—6' are preferably actuated in unison as pairs, and the manual operating members 108—108 and 121—121 are preferably mechanically connected in pairs in any suitable manner for unitary manipulation. Each manual operating member or control 108 and 121 is also adapted upon actuation to start the electric motor 81 which in turn drives the pumps 82 and 83. Pressure fluid is thereby directed to one pair of the cylinder and piston motors through either the control valves 94 or the control valves 95 each time a manual control member is actuated.

The ball checks 102, 105, and 113, 116 block the main flow of fluid to the actuated motors thereby causing said fluid to pass through one of the restriction valves 103, 106, 114, or 117 as hereinbefore indicated. The restriction valves serve to prevent a sudden rocking of the cradle and associated charging box in such manner as to rapidly change the center of gravity of the load thereby causing the cradle to come to an abrupt stop at the end of the rocking motion.

As well shown in FIG. 3, at the beginning of the rocking motion the cylinder and piston motors 6 are pressing directly upwardly against the weight of the cradle 5 and the loaded charging box 4. As said charging box starts to tilt, the load begins to shift in the charging box and the center of gravity of the load moves rapidly to the left as shown in the drawing. This movement of the center of gravity actually assists the rocking motion and would result in the cradle and associated charging box being thrown toward the left if the rocking motion were not carefully restrained and controlled. However, when the cradle is being returned to the level position, no such restraint upon its movement is necessary since the load of scrap has at that time been discharged from the box and also because the center of gravity of the entire mechanism is being returned toward the center of the car.

By means of the scrap charging car of this invention, the scrap is first conveyed to the furnace vessel at which point it is quickly dumped into the waiting furnace and then returned to be reloaded with scrap. The rocking motion given to the charging boxes causes them not only to tilt but also to concurrently move outwardly in the direction of the furnace for more accurate charging. This outward movement of the boxes is advantageous to the operation in that in the normal, level position of the charging box, more clearance is provided between the car and the furnace or adjacent building columns as said car is moved into position for the charging operation. The fact that the load is merely rolled over for dumping purposes means that less power is necessary to effect the operation. Under normal conditions, only one cylinder and piston motor associated with each cradle and charging box is absolutely necessary for dumping the load, but to insure positive and dependable action under even adverse conditions, it is preferred that the motors of a given pair be simultaneously actuated.

As well shown in FIG. 3, the cradle 5 has a pair of spaced, parallel, rearwardly extending plates 125 which are disposed beneath the supporting plate 31 adjacent the closed end of the charging box 4. A lift rod 126 is mounted between the plates 125, said lift rod being positioned outwardly beyond the closed end of the charging box. Said lift rod provides means whereby the cradle 5 and its associated charging box 4 may be tilted or rocked by means of a crane or the like in case of a power failure such as a lack of electrical current. However, the normal and preferred operation is by means of the motors 6 and 6' whereby the rocking motion is carefully controlled and restrained in the manner hereinbefore set forth.

It will be understood that many changes in the details of this invention may be made without, however, departing from the spirit thereof or the scope of the appended claims.

What is claimed is:

1. A scrap charging car comprising a body portion movable to and from a furnace; a pair of track members mounted transversely on said body portion; a cradle having a pair of rocker members engaging said track members respectively whereby said cradle is optionally tiltable from a horizontal position to a tilted discharge position; said rocker members having straight portions and toothed curved portions; each track member comprising a pair of parallel, spaced rails defining an open-bottomed slot therebetween; a plurality of spaced cross members connecting each pair of rails adjacent to one end of each said track member adapted to engage the teeth of the adjacent curved portion when said cradle is tilted to said discharge position; said straight portions of said rocker members having elongated ribs projecting downwardly into said slots when said cradle is in a horizontal position; lifting means connected to said cradle adjacent to said straight portions actuatable to rock said cradle transversely onto said curved portions; and a charging box having a discharge end adjacent to said curved portions mounted upon said cradle whereby it discharges its contents when said cradle is tilted to said discharge position.

2. A scrap charging car as set forth in claim 1 including a pair of elongated link members pivoted respectively to said cradle and said body portion and to each other in such manner as to fold when said cradle is in said horizontal position and to be aligned when said cradle is in said tilted discharge position, said link members limiting the tilt of said cradle to its maximum tilted position.

3. A scrap charging car as set forth in claim 1 including a flat shield pivotally depending from the end of said cradle adjacent the discharge end of said charging box in such manner as to remain in a vertical position throughout the rocking motion of said cradle and so positioned as to provide a constant barrier between said track and rocker members and the furnace.

References Cited in the file of this patent

UNITED STATES PATENTS

| | | |
|---|---|---|
| 903,921 | Treadwell | Nov. 17, 1908 |
| 1,013,341 | Wallwork | Jan. 2, 1912 |
| 1,026,708 | Sherman | May 21, 1912 |
| 1,223,031 | Clark | Apr. 17, 1917 |
| 1,305,118 | Junghanns | May 27, 1919 |